Figure 3:
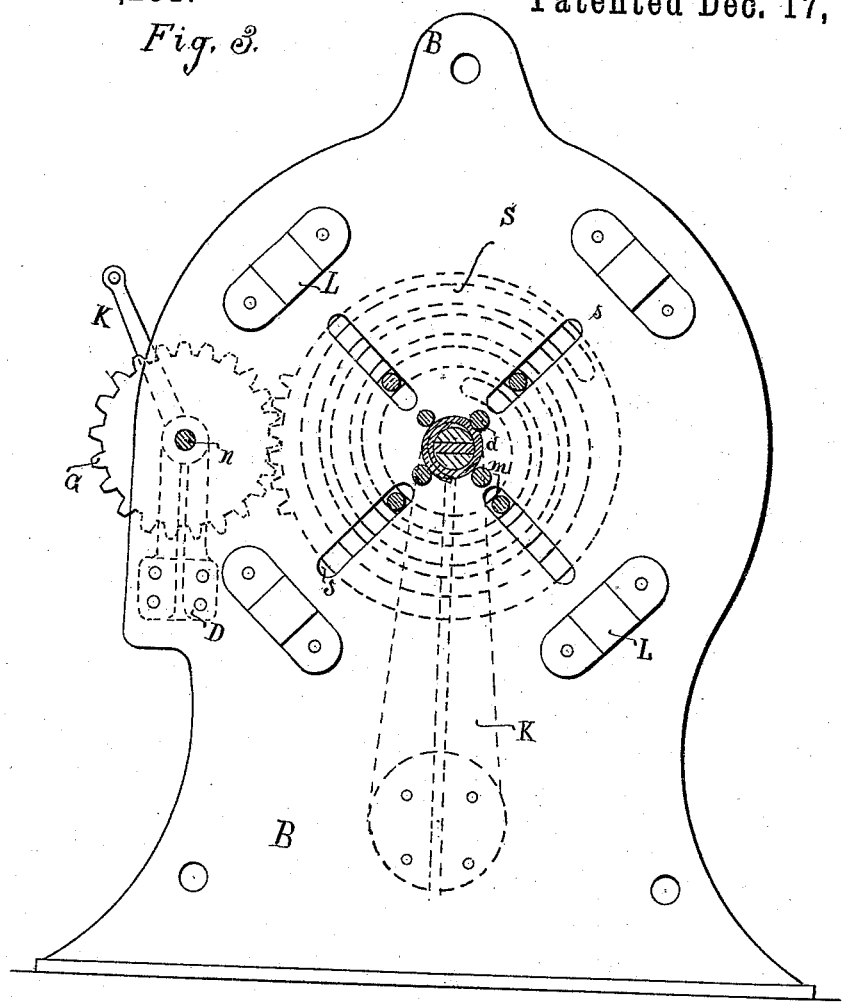

(No Model.) 3 Sheets—Sheet 1.
C. KLINIK, F. PINKOWSKI & A. GROSS.
MACHINE FOR THE PREPARATION OF LEATHER.
No. 417,251. Patented Dec. 17, 1889.
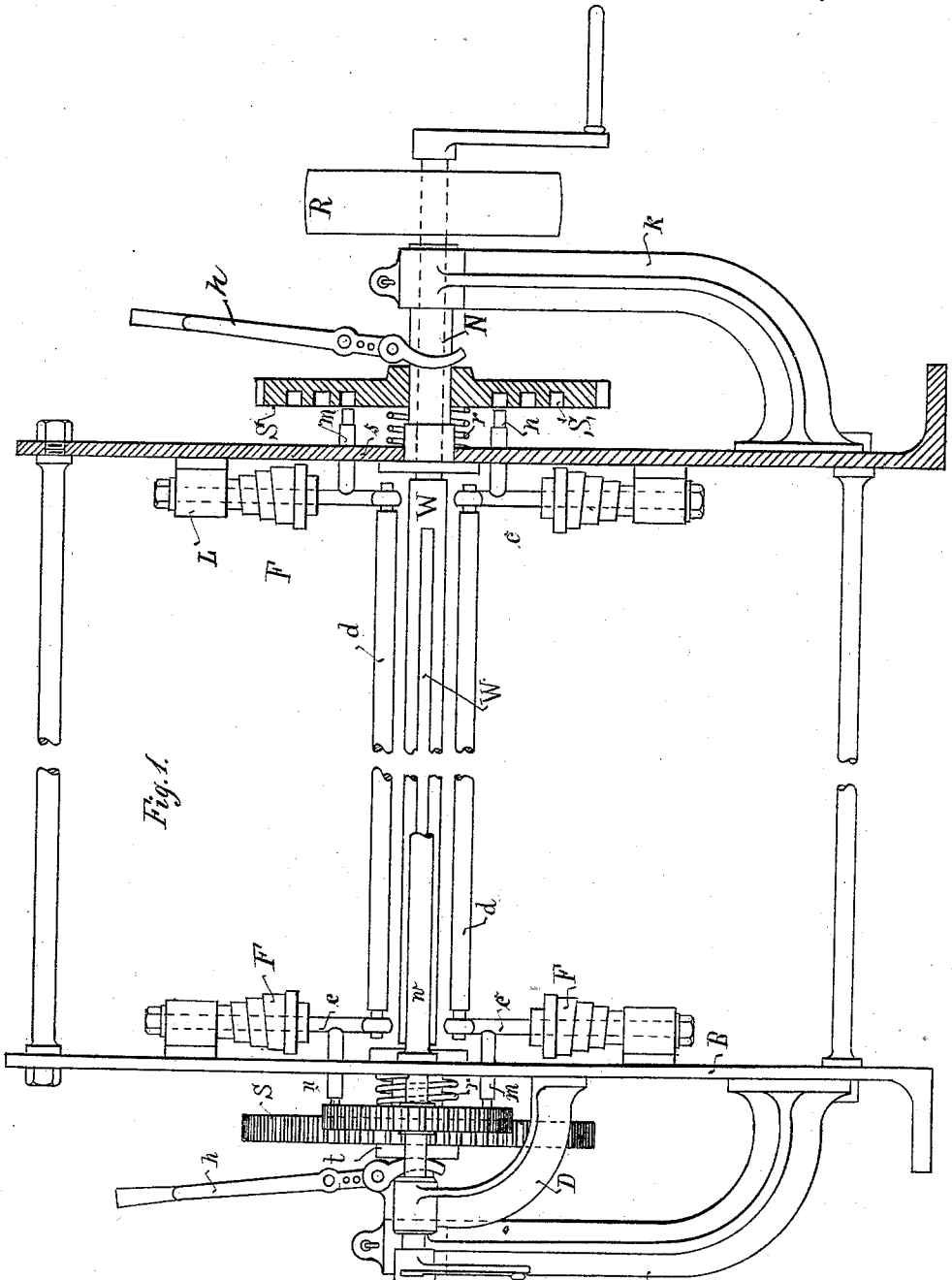

(No Model.) 3 Sheets—Sheet 2.
C. KLINIK, F. PINKOWSKI & A. GROSS.
MACHINE FOR THE PREPARATION OF LEATHER.
No. 417,251. Patented Dec. 17, 1889.
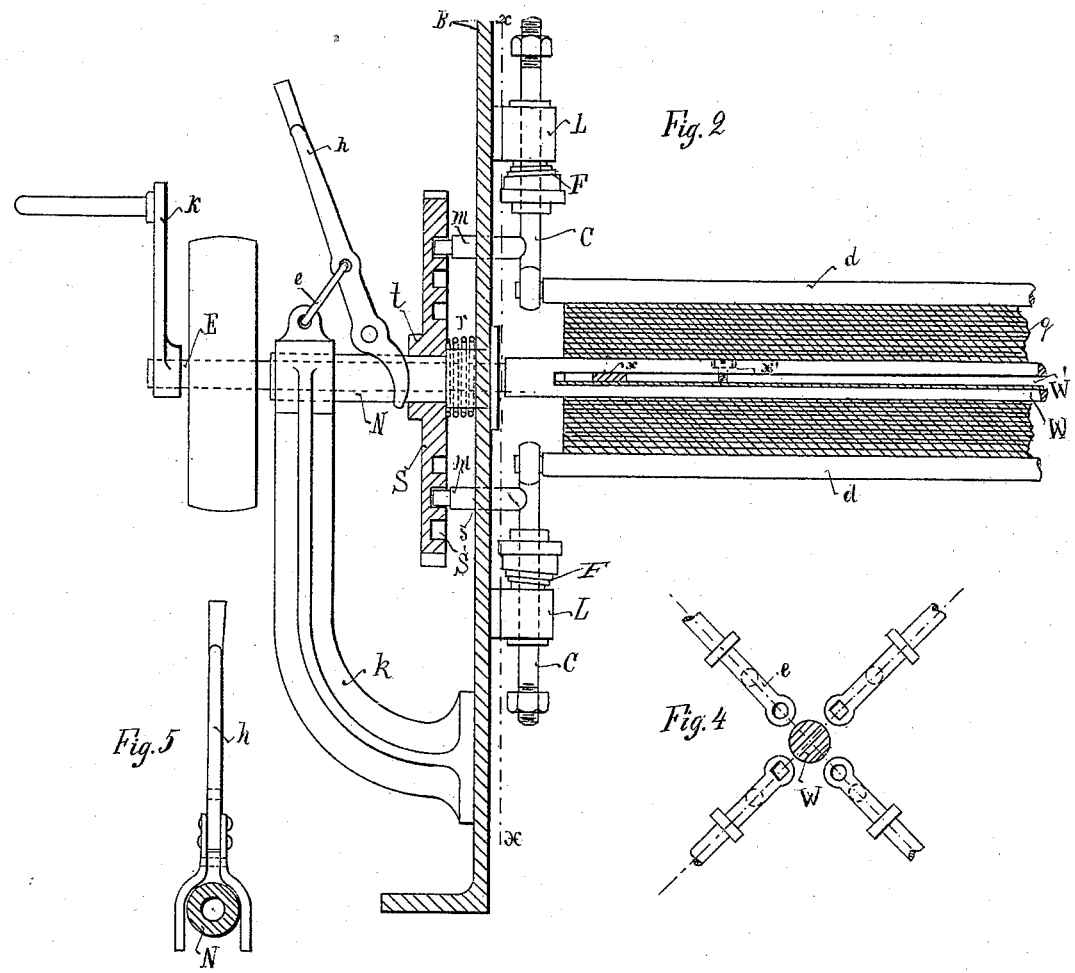
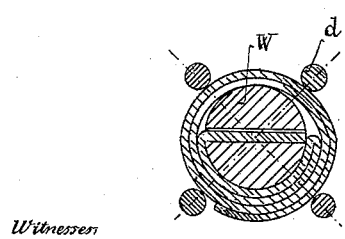
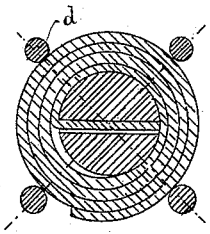

(No Model.)   3 Sheets—Sheet 3.

C. KLINIK, F. PINKOWSKI & A. GROSS.
MACHINE FOR THE PREPARATION OF LEATHER.

No. 417,251.   Patented Dec. 17, 1889.

UNITED STATES PATENT OFFICE.

CONSTANTIN KLINIK AND FRIEDRICH PINKOWSKI, OF KÖNIGSHÜTTE, AND AUGUST GROSS, OF BEUTHEN, PRUSSIA, GERMANY.

MACHINE FOR THE PREPARATION OF LEATHER.

SPECIFICATION forming part of Letters Patent No. 417,251, dated December 17, 1889.

Application filed January 21, 1889. Serial No. 297,078. (No model.)

*To all whom it may concern:*

Be it known that we, CONSTANTIN KLINIK, FRIEDRICH PINKOWSKI, and AUGUST GROSS, the two former of Königshütte, and the latter of Beuthen, in the Kingdom of Prussia and German Empire, have invented a new and useful Machine for Preparation of Leather, of which the following is a specification, reference being had therein to the accompanying drawings.

Our invention relates to a machine for preparation of leather.

The machine is fully explained in the accompanying drawings.

Figure 1 shows partly in longitudinal section, partly in front view, the machine from one side. Fig. 2 shows a longitudinal section of the back part of the machine. Fig. 3 is a cross-section through the machine in the direction of the lines $x\,x$ of Fig. 2, and specially shows an upright frame with the corresponding guides for the roller-bars. Fig. 4 shows the connection of the spring-bolts $c$ with the roller-bars $d$ and the arrangement of the same around the cylinder. Fig. 5 shows the lever $h$ and sleeve N. Figs. 6 and 7 show the manner of working the leather-preparing machine in the course of the two operations before described. Fig. 6 further shows the position of the leather on the cylinder W when the same is twined forward. Fig. 7 moreover shows the formation of the large loop on reversing the cylinder.

This machine is intended to simplify the preparation of every description of leather, for smoothing it, and giving to the leather a suppleness which makes the same adapted at once for any further working.

The machine works in such a way that the leather, which is tightly connected at one end to a cylinder, on the revolution of the same is wound onto it, and bars, or "roller-bars," as they are called, press against the rolled leather, while these, by a forced motion on spiral disks, by means of springs or elastic springs or without them, are pressed down against the cylinder, and thus the leather rubbing against these roller-bars becomes smoothed. When the whole piece of leather is rolled, the cylinder is then reversed. The encircling leather immediately surrounding the cylinder is then loosened, by which it forms a large loop, the outer circumference of which, that had been turned toward the cylinder, becomes the inner surface of the ring. This undulating loop is repeated through the circles of the leather rings, one after another, from ring to ring till the whole of the leather is rewound in this direction. By these means the inner surfaces of the leather rings are rubbed against each other, and the whole of the leather thus becomes by the undulating motion smoothed and made supple.

In the two standards B B the cylinder W is arranged to revolve, and can be rotated by means of a winch-handle. This cylinder W is used for winding round the leather, and is for the purpose furnished with a slot W', in which the end of the leather is introduced. In this the end of the leather is fastened with wedges $x$ or pins $x'$. The roller-bars $d$ press against the leather rolled round the cylinder W, the ends of which are connected by spring-bolts $c$, which are arranged in the bushes L on the frame B B, so as to be movable. On the spring-bolts $c$ lie the spiral springs F, which press the roller-bars against the leather wound round the cylinder W. Of the roller-bars $d$ the one which is connected with the spring-bolts $c$ is movable, while the one next those supported by the spring-bolts is fast, so that one set of the roller-bars can be turned while the other set presses without turning against the leather and controls the same on the revolving of the cylinder. By means of the pins $m$, fixed to the spring-bolts $c$, which slide in the slots $s$ of the stand-frame B B, Fig. 7, the roller-bars $d$ are guided so that they can only press radially against the cylinder W. By means of the winch-handle K the cylinder W is set in motion after the edge of the leather to be dealt with has been introduced and fixed in the slot W' of the cylinder. The roller-bars press against the leather, and consequently the leather convolutions are pressed with a certain resistance under and through the rollers, whereby the rough outside surfaces are smoothed by friction against these rollers, Fig. 6. After the whole piece of leather is rolled up the movement of the cylinder is reversed, and the encircling ring or convolution next the cylinder W is loosened and is reversed, whereby it forms a large loop, the outside circumference of which, that had been turned toward the cylinder, becomes the inner surface of the ring. (See Fig. 7.) This loop is repeated through the circles of the leather rings or convolutions, one after another, from ring to ring, until the whole of the leather is wound up. By this means the inner surfaces of the leather rings rub against each other, and the whole of the leather thus becomes, by the undulating motion, not only smoothed, but made supple. While the encircling ring is being wound round next to the cylinder W and the motion of the same continues, all the remaining leather rings, being pressed together by the roller-bars $d$, are prevented from taking part in the motion of same. This motion is only gradually communicated to the whole of the rings, whereupon the process is repeated. The leather thus prepared, after the completion of the process, in consequence of the great pressure on it by the rollers $d$ by means of the spring F, would be very difficult to unwind. A mechanism is therefore provided by which the pressure of the springs can be diminished with ease and in the shortest time. This means consists chiefly of two spiral disks which on the outside of two standard frames and sleeves N on the cylinder B are arranged to shift, and on one side of them a spiral-shaped groove of any required height is introduced, which serves for the reception of the pivots $n$ on the pins $m$ of the spring-bolts $c$. The spiral disks are placed on the sleeves N, which are fitted loosely on the two journals E of the cylinder W, and during the preparation of the leather by the roller-bars $d$ are without contact with the pivots (or pins) $n$. (See Fig. 1.) If, on the other hand, the leather is already prepared and is to be unwound from the cylinder W, both the disks S, by means of levers $h$, Figs. 1, 2, and 5, are pushed forward against the pins $n$, so that they press against the latter. The disks are furnished on their outer circumference with teeth, which the teeth of the back wheels G gear into. The latter are furnished on one or on both ends with handles K′, fixed to the winch-cylinders in such a way that on turning one of the handles K′ both the disks S are turned equally. When the disk S presses against the pins $n$, the winch-handle K and the disk S being turned until the pin $n$ is exactly opposite one of the undulating passages, then both the disks S, by the action of the lever $h$, will be pressed still farther into the groove of the disk. If the levers $h$ are now, by means of the hook $e$ on the bush $k$, made fast and the disks S turned forward, the pins $n$ move, and with them the spring-bolts $c$, under the force of the pressure of the spring F, outward, and the leather cylinder can then be easily unrolled. By turning the disk forward the rollers $d$ are again brought near the cylinder. Then the action of the lever $h$, by means of the hook $e$, is freed, and the disks S, consequently, by the spring $r$, are removed from the pins $n$, whereby the connection of the disks S is freed. By the action of the disks S, moreover, the pressure upon the leather can be at pleasure increased or diminished.

As already stated, half of the roller-bars $d$, which inclose the leather, are reversible. The other half are fixed with the spring-bolts $c$ and their supports $m'$, Fig. 4. The surfaces of the leathers slide off the fixed rollers and become smooth.

What we claim, and desire to secure by Letters Patent of the United States, is—

1. In a machine for preparing leather, a cylinder to which the leather is attached and on which it is wound, in combination with a series of independently radially movable roller-bars arranged to press upon the leather as it is wound upon the cylinder, and a regulator arranged to act upon all the said bars simultaneously, whereby the general pressure of the said bars upon the leather may be increased or diminished, substantially as and for the purposes specified.

2. In a machine for preparing leather, a cylinder to which the leather is attached, in combination with adjustable roller-bars arranged to press upon the cylinder and an adjustable spirally-grooved disk arranged to engage the journals of said rollers, whereby the pressure of the latter may be taken off at will, substantially as and for the purposes specified.

3. In a machine for preparing leather, a cylinder to which the leather is attached, in combination with the adjustable roller-bars $d$, mounted in movable bolts $c$, the springs F, the pins $m$, attached to the said bolts, and the sliding revoluble disk S, provided with a spiral groove upon its inner face arranged to engage the pins $m$ when moved toward them, substantially as and for the purposes specified.

In witness whereof we hereunto set our hands in presence of two witnesses.

CONSTANTIN KLINIK.
FR. PINKOWSKI.
AUGUST GROSS.

Witnesses:
CONSTANTIN SCHARTA,
ROBERT MÜOKE.